United States Patent [19]

Hahn et al.

[11] 4,311,636

[45] Jan. 19, 1982

[54] FLAME-RETARDANT THERMOPLASTIC MATERIALS AND MOLDED PARTS THEREFROM

[75] Inventors: Klaus Hahn, Lampertheim; Walter Himmele, Walldorf; Herbert Naarmann, Wattenheim; Klaus Penzien, Frankenthal, all of Fed. Rep. of Germany

[73] Assignee: BASF Aktiengesellschaft, Ludwigshafen, Fed. Rep. of Germany

[21] Appl. No.: 102,085

[22] Filed: Dec. 10, 1979

[30] Foreign Application Priority Data

Dec. 14, 1978 [DE] Fed. Rep. of Germany ....... 2853992

[51] Int. Cl.³ ........................... C08K 5/02; C08K 5/34
[52] U.S. Cl. ........................... 260/45.8 N; 260/45.7 P; 260/45.7 R; 260/45.9 R; 260/45.95 G; 521/94; 521/907
[58] Field of Search ............... 260/45.8 N, 45.8 NB; 521/94, 907

[56] References Cited

U.S. PATENT DOCUMENTS

| | | | |
|---|---|---|---|
| 3,457,204 | 7/1969 | Burger et al. | 260/45.7 RL |
| 3,590,014 | 6/1971 | Burt | 521/94 |
| 3,624,024 | 11/1971 | Caldwell et al. | 260/45.8 NB |
| 3,832,422 | 8/1974 | Little et al. | 260/45.8 NZ |
| 3,873,567 | 3/1975 | Cyba | 260/45.8 NB |
| 4,026,963 | 5/1977 | Rim et al. | 260/45.8 NB |
| 4,029,614 | 6/1977 | Nintz et al. | 521/94 |

*Primary Examiner*—Morton Foelak
*Assistant Examiner*—R. A. White
*Attorney, Agent, or Firm*—Norbert M. Lisicki

[57] ABSTRACT

Flame-retardant thermoplastic materials are prepared from polymers and copolymers of styrene, organic halogen compounds and compounds synergistic with the halogen compounds. These synergistic compounds contain heterocyclic amide or imide groups linked by a labile —C—C— linkage.

3 Claims, No Drawings

FLAME-RETARDANT THERMOPLASTIC MATERIALS AND MOLDED PARTS THEREFROM

BACKGROUND OF THE INVENTION

1. Field of the Invention

The invention relates to flame-retardant thermoplastic materials which are prepared from polymers or copolymers of styrene and which contain an organic halogen compound. More particularly, these polymers incorporate a bromine compound as the flame retardant and a halogen-free synergistic compound having labile —C—C— linkages. These synergistic compounds contain two nitrogen atoms, each of which is part of a heterocyclic ring system and both of which are bonded to the labile —C—C—bridge member.

2. Description of the Prior Art

The most pertinent prior art, which teaches the use of flame retardants and synergists for the flame retardants in thermoplastic molded materials, are the following: (1) German Application 1,244,395, (2) German Application 2,525,697, and (3) German Published Application 2,737,913.

The state-of-the-art is covered extensively and is summarized in (1) (see column 1, paragraphs 1–4). In order to improve the effect of the bromine-containing flame retardants, it is taught in (1) that synergistic compounds in amounts of 0.01 to 5 percent by weight based on the molded material, are added to the flame-retardant compound. These compounds containing labile linkages, which have a synergistic effect with the flame retardant, may contain chlorine, bromine, cyanogens, or nitro groups as substituents. It is taught that the synergistic compounds increase the effect of the bromine-containing flame retardants. The use of dehydropolymers of mono-, di- or trisubstituted benzene, which contain a cycloaliphatic hydrocarbon radical with 5 or 6 carbon atoms as synergistic compounds when employed in amounts of 0.05 to 2 percent by weight, is known from (2).

In (3) the use of halogen-containing flame retardants which are based on N,N'-alkylene-bis-tetrabromphthalimides is taught, wherein the alkylene group contains 2 to 15 carbon atoms. This compound class is a flame retardant containing a minimum content of about 35 to 40 percent bromine and which must be used in considerable quantities, namely, in quantities of 1 to 25 percent by weight based on the weight of the material containing the flame-retarding agent. The synergistic compounds recommended for these flame retardants are zinc borate, sodium tetraborate, lead arsenate, and similar materials, particularly, antimony oxide. The compounds taught in (3) are thermally-stable compounds which do not decompose at high temperatures or under the influence of light.

The synergistic compounds known from (1) have the drawback that they contain additional halogen, cyanogen, and/or nitro groups in addition to the bromine contained in the flame retardant. In the case of a fire, these compounds can cause considerable secondary damage due to the corrosive gasses evolved. Recently, there have been attempts to reduce the quantity of substituents forming corrosive gasses in the combination of flame retardant and synergistic compound. The teachings of reference (2) also point in this direction.

The purpose of this invention, therefore, was to reduce the bromine content of the flame retardant plus the synergistic compound as compared to the systems taught by (1) while retaining those good flame extinguishing times as taught by (1). According to the instant invention, shorter flame extinguishing times are achieved, when compared with the systems taught by (2). In comparison with the synergistic compounds taught by (2), it is also desirable to make available additional halogen-free synergistic compounds which can be produced cheaply and easily.

DESCRIPTION OF THE PREFERRED EMBODIMENTS

In accordance with this invention, therefore, there are provided flame-retardant thermoplastic, molded materials comprising: (a) polymers or copolymers of styrene, (b) organic halogen compounds in quantities effective as flame retardants, and (c) halogen-free compounds, having labile —C—C—linkages, synergistic with the flame retardants and (d) possibly other commonly used additives in effective quantities, wherein said labile —C—C— compounds contain at least one amide or imide grouping each or mixtures of these groupings bonded to the —C—C—bridge member according to the formula

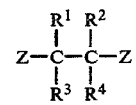

and wherein $R^1$, $R^2$, $R^3$ and $R^4$ are selected from the group consisting of linear or branched saturated alkyl radicals containing 1 to 10 carbon atoms, saturated cyclic radicals containing 5 to 10 carbon atoms, and alkyl-substituted cycloaliphatic radicals containing 5 to 10 carbon atoms, and Z is a heterocyclic amide or imide, saturated or unsaturated which may or may not be substituted on the carbon atoms with alkyl or alkenyl radicals containing 1 to 4 carbon atoms, and which cyclic amide or imide may have an aromatic ring as part of the heterocyclic ring, and said aromatic ring may be substituted with alkyl radicals containing 1 to 4 carbon atoms.

The polymers or copolymers of styrene of the present invention, may be polystyrene as well as mixed polymers of styrene containing at least 50 percent by weight of styrene in the polymerized form. Monomers which may be employed for the copolymerization include methylstyrene, acrylonitrile, methacrylonitrile, as well as the esters of acrylic or methacrylic acid and an alcohol with 1 to 8 carbon atoms, vinyl pyridine, N-vinyl compounds, as well as N-vinyl-carbazole, butadiene, or divinylbenzene.

The molded materials for the manufacture of flame-retardant molded parts may also contain styrene polymers which are impact resistant. These impact resistant styrene polymers include, for example, mixtures obtained by the polymerization of styrene, possibly together with other monomers, in the presence of finely distributed rubber-like polymers. Such polymers can also be produced by mixing styrene acrylonitrile copolymers with butadiene or acrylate polymers.

Possible flame retardants which may be employed are the organic halogen compounds which include chlorinated paraffins, chlorinated phenols, ammonium chloride, and chlorinated esters of carboxylic and/or dicarboxylic acids. Organic bromine compounds, however, are preferred as the flame retardants.

Particularly well suited bromine-containing flame retardants are: tetrabromobutane, dibromoethylbenzene, hexabromobenzene, hexabromobutene-2, brominated ketones, tribromophenylallylether, esters or acetals of dibromopropanol such as tris-(dibromopropyl)-phosphate, and pentabromodiphenylether. Particularly well suited are those organic bromine compounds which are difficult to volatilize, and which do not act as plasticizers and which do not have an unpleasant odor. Particularly well suited for this purpose are brominated products of butadiene or isoprene oligomers or polymers such as 1,2,6,5,9,10-hexabromocyclododecane or the octabromohexadecane as well as brominated natural and synthetic rubbers.

The halogen content of the flame retardant should be at least 35 percent of the molecule. It should be used in quantities of at least 0.1 percent by weight, and no more than 5 percent of the molded material. Preferably, not more than approximately 0.3 to 1 percent by weight of halogen, particularly bromine, should be used based on the total weight.

The molded materials according to this invention contain halogen-free compounds synergistic with the flame retardant. The synergistic compounds are based upon compounds containing labile —C—C— linkages with the —C—C—bridge being totally substituted. Compounds symmetrically, as well as asymmetrically, substituted, with respect to the bridge—C—C— atoms, are suited for this purpose. This includes nitrogen-containing ring systems which are attached to the bridge—C—C— atoms. The synergistic compounds to be used according to the invention may be described by the general structural formula below

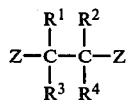

wherein $R^1$, $R^2$, $R^3$ and $R^4$ are selected from the group consisting of linear or branched saturated alkyl radicals containing 1 to 10 carbon atoms, saturated cyclic radicals containing 5 to 10 carbon atoms, and alkyl-substituted cycloaliphatic radicals containing 5 to 10 carbon atoms, and Z is a heterocyclic amide or imide, saturated or unsaturated, which may or may not be substituted on the carbon atoms with alkyl or alkenyl radicals containing 1 to 4 carbon atoms, containing 4 to 24 carbon atoms, and which cyclic amide or imide may have an aromatic ring as part of the heterocyclic ring, and said aromatic ring may be substituted with alkyl radicals containing 1 to 4 carbon atoms. Particularly preferred substituents as $R^1$, $R^2$, $R^3$ and $R^4$ are methyl, ethyl, propyl, isopropyl, butyl and tertiary butyl.

The substituent Z is a heterocyclic ring system derived basically from the cyclic imides or amides which are primarily part of a saturated or unsaturated 4 to 7 member ring. An aromatic nucleus can be attached to this 4 to 7 member ring system. This aromatic nucleus may be further be substituted by alkyl groups containing from 1 to 4 carbon atoms.

The amide or imide group containing heterocyclic ring system is preferably a 5 or 6 member ring system with nitrogen as the hetero atom. Examples include: the imide of succinic acid and the imide of glutaric acid. The corresponding amides of monocarboxylic acids are butyramide and valeramide with 5 to 6 member ring lactam structures. The lactam of caproic acid as well as the imide of adipic acid may be employed, both of which have a 7 member ring.

Of the unsaturated compounds, the maleic imide, which is a 5 member ring, is preferred. Alkyl substituted rings containing methyl, ethyl propyl or butyl and also alkenyl-, such as vinyl-, particularly for the imide of succinic acid may be employed.

An aromatic system may also be a part of the heterocyclic ring system. Examples of this include the phthalic imide or the 3-, 4-benzopyrrolidone-2. These groups may also be substituted once or several times at the aromatic ring systems with alkyl groups containing 1 to 4 carbon atoms. In the case of the benzopyrazolone, the carbon atom adjacent to the hetero atom may be substituted if so desired.

The concentration of the synergistic compound in the molded material is from about 0.1 to 1 percent by weight, preferably 0.2 to 0.5 percent by weight, based on the weight of the thermoplastic polymer.

The molded materials may contain other optionally employed components such as fillers, pigments, lubricants, release agents, plasticizers, antistatic, agents antiaging agents, stabilizers, or foam promoting agents.

The molding particles may be produced in finely particled form, for example, in bead form, in the form of cylindrical granules, or in the form of crumbs as may be obtained by grinding the polymerized substances. It is desirable for the particles to have a diameter of 0.1 to 6 millimeters, preferably 0.4 to 3 millimeters.

The molded materials may be processed into fire-retardant molded parts or profiles by spray injection or extrusion. Due to the relatively low organic halogen compound content, the molded materials, according to the instant invention, have softening points which differ only slightly from those of the polymers contained therein.

Molded materials which are suitable for the manufacture of fire-retardant foam parts are of particular importance. In addition to the styrene polymers, the organic bromine compounds and the synergistic compounds, blowing agents are employed.

Commonly used liquid or gaseous organic compounds which do not dissolve the polymer and which have a boiling point below the softening point of the polymer are employed as blowing agents. These blowing agents include aliphatic or cycloaliphatic hydrocarbons such as propane, butane, pentane, hexane, heptane, cyclohexane; or halogenated hydrocarbons such as methylene chloride, dichlorodifluoromethane, or 1,2,2-trifluoro-1,1,2-trichloroethane. Mixtures of these blowing agents may also be employed. It is advantageous to use 3 to 12 percent by weight of blowing agent based on the styrene polymer.

Fire-retardant foam parts are obtained from such foamable materials, for example, by heating fine particles of these materials in gas-permeable molds to temperatures above the softening point of polymers contained in the mixtures so that the particles expand and are welded into molded parts. Such foamable materials can also be processed into foam foils with the aid of extruders.

In order to produce flame-retardant foamed sheets or foils, the individual components of the materials may be mixed together with a blowing agent. The materials are advantageously mixed in a continuously operating mixing device, for example, an extruder. The operating temperatures are above the softening point of the plastic materials. The mixtures should be kept under a pressure which is at least equal to the vapor pressure of the blowing agent. This prevents the mixtures from foaming during the mixing process or during the heating to temperatures above the softening point.

The mixtures are pressed into a zone of lower pressure. The pressure in this zone is less than the pressure of the blowing agent at the prevailing temperature, so that the mixtures foam. In most cases, it is desirable to press the mixtures into a zone under normal pressure. At times, it may be advantageous to keep the pressure in that zone below normal pressure.

For the manufacture of the molded materials, the synergistic compounds may be mixed with the organic bromine compounds individually or in sequence with the styrene polymers and possibly with other components. They may be introduced into the plastic material on the rollers, in the extruder, or in a kneading device. As is commonly done, they can, in many cases, be added to the monomers prior to the polymerization reaction. In the manufacture of cast foils, for instance, it is also possible to add the synergistic compound together with the bromine compound to a solution of the plastic and evaporate the solvent.

It is of particular advantage that the compounds having the synergistic effect do not effect the polymerization of the styrene. For the manufacture of the molded materials therefore, the monomers can be polymerized in the presence of the synergistic compounds used according to this invention as well as the organic bromine compounds. In this manner, the flame retardants and the synergistic compounds are distributed homogeneously in the mass. Another advantage is that handling synergistic compounds is not dangerous compared to other substances which may increase the toxic effects of the organic bromine compound. It has also been found that the flame-retardant property of the materials is not lost even if they are stored at high temperatures for long periods of time. A particular advantage, however, is the fact that the synergistic compounds are not volatile. Thus, the materials are less hazardous physiologically.

The flame-retardant molded produced from the materials are tested in the following manner: Unfoamed molded parts having dimensions of 0.1 by 10 by 30 centimeters and foamed molded parts having dimensions of 0.5 by 15 by 40 centimeters, are held into a gas flame having a height of 40 millimeters for a period of 5 seconds. The flame is subsequently removed with a steady movement. The time of flame extinguishment of the molded part after removal from the gas flame is a measure of its flame retardancy. Molded materials which are insufficiently protected or do not have a hard-to-ignite finish will totally burn after removal from the flame.

The synergists listed below were used in the following examples.
Synergist a 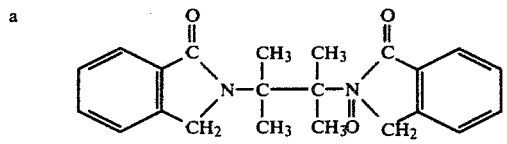

b
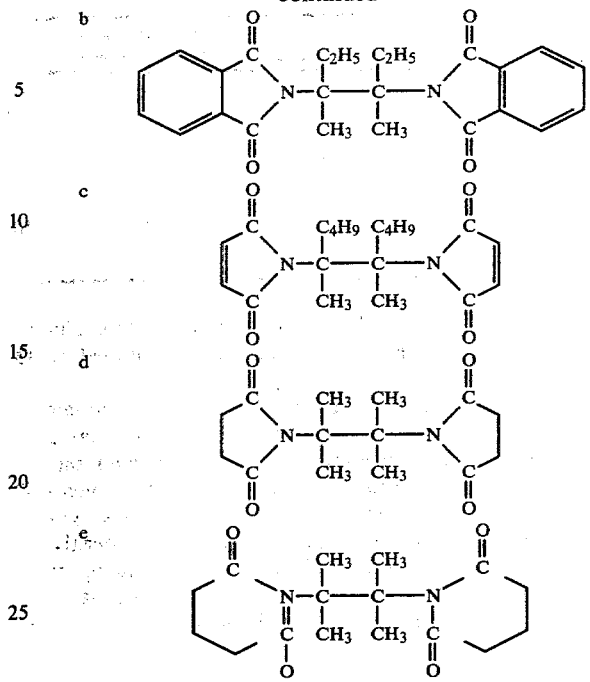

1,1'-diphenylbicyclohexyl according to German Application 2 525 697 (2)

g 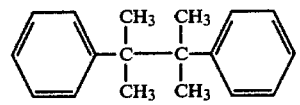

according to German Application 1 244 395 (1).

The following examples further illustrate the nature of the invention. The parts and percentages referred to in the examples are by weight.

EXAMPLES 1 TO 5

In each example, 30 parts of a styrene polymer, one part of HBCD (hexabromocyclododecane) as well as 0.2 part of the indicated synergistic compound are dissolved in 100 parts of methylene chloride followed by 3 parts of pentane. The resulting solution is poured onto a glass plate and the methylene chloride is allowed to evaporate at room temperature. The homogeneously distributed pentane remains in the mixture. The foil obtained in this manner is foamed at 100° C. and is dried in a vacuum at 35° C. for a period of 12 hours. The resulting foam foils are tested for their flammability according to the method described above. The results are listed in the Table below.

COMPARISON EXAMPLES 6 AND 7

As described in Examples 1–5, foam were produced with the above-described compounds listed under f and g and the foils were tested for their flammability. The results are listed in the Table and are compared with the results of Examples 1–5. The flame-extinguishing time in seconds was used to measure the effect of the various synergists. The synergistic compounds of the instant invention show a considerable improvement over the compounds of the prior art.

| Example | Synergistic Compound | Flame-Extinguishment Time in Seconds |
| --- | --- | --- |
| 1 | a | 1.0 |
| 2 | b | 1.5 |
| 3 | c | 2 |
| 4 | d | 2.5 |
| 5 | e | 2 |
| Comparison Example 6 | f | 4.5 |
| Comparison Example 7 | g | 6.5 |

The embodiments of the invention in which an exclusive privilege or property is claimed are defined as follows:

1. Improved flame-retardant thermoplastic materials comprising (a) polymers of styrene, and (b) organic halogen compounds in amounts effective as flame retardants, wherein the improvement comprises halogen-free compounds, having labile —C—C— linkages, synergistic with the flame retardants wherein said synergistic compounds contain amide or imide grouping or mixtures of these groupings bonded to the —C—C— bridge member according to the formula:

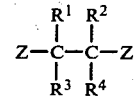

and wherein $R^1$, $R^2$, $R^3$ and $R^4$ are selected from the group consisting of linear or branched saturated alkyl radicals containing 1 to 10 carbon atoms, saturated cyclic radicals containing 5 to 10 carbon atoms, and alkyl-substituted cycloaliphatic radicals containing 5 to 10 carbon atoms, and wherein Z is a heterocyclic amide or imide, saturated or unsaturated, which may or may not be substituted on the carbon atoms with alkyl or alkenyl radicals containing 1 to 4 carbon atoms, and which cyclic amide or imide may have an aromatic ring as part of the heterocyclic ring, and said aromatic ring may be substituted with alkyl radicals containing 1 to 4 carbon atoms.

2. The thermoplastic materials of claim 1 wherein the polymers contain rubbers as impact resistant modifiers.

3. The concentration of the synergistic compounds of claim 1 is from about 0.1 to 1 percent by weight based on the weight of the thermoplastic polymer.

* * * * *